J. Barron,
Dry Dock,
No. 272.
Patented July 17, 1837.
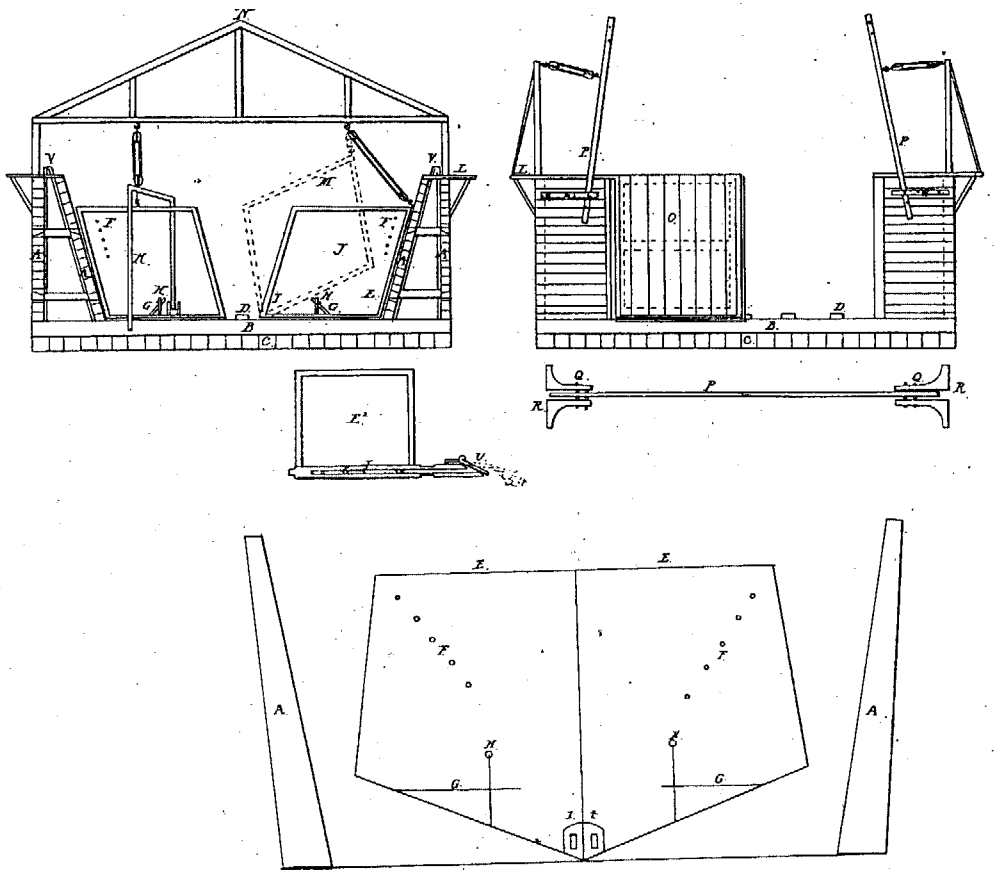

UNITED STATES PATENT OFFICE.

JAMES BARRON, OF PHILADELPHIA COUNTY, PENNSYLVANIA.

FLOATING DRY-DOCK.

Specification of Letters Patent No. 272, dated July 17, 1837.

*To all whom it may concern:*

Be it known that I, JAMES BARRON, of the county of Philadelphia and State of Pennsylvania, have invented a new and Improved Floating Dry-Dock and a Method of Pumping it Out; and I do hereby declare that the following is a full and exact description.

This dock is constructed of logs of any kind of timber, from one to two feet square, and in the following manner. The first tier is laid lengthwise, the second crosswise, and on them is laid the stretchers (five or more in number), and on those stretchers are laid the blocks to receive the keel of the ship; and in this manner the bottom of this dock may be increased in thickness and strength, to answer the purpose of docking a ship of any size. The wood bolts are to be of large size, say from three to four inches diameter which is double the size they are ever put into vessels built in the ordinary way as it would require holes so large as would destroy the strength of their plank and timber, and those wood bolts are to be put as near together as may be required for all the purposes of strength. The sides of this dock are also formed of logs of any suitable thickness, from one foot to 18 inches, and in the manner now described. The outer tier of logs is laid horizontally, and rises up perpendicular; the inner tier is laid four or five feet within the outer tier, at the bottom of the dock, and the upper parts of it approach the upper part of the outer tier, within a foot or 18 inches; the inner tier forming an obtuse angle with the bottom of the dock, and an acute one, with the outer side of the dock, presenting the figure of a triangle, and having upright posts between them, at proper distances from each other, say about every eight or ten feet; these posts are to be let into the bottom logs ten or twelve inches to secure their heels, and the log work also connected with each other by dovetail-cog-work. Thus the sides of this dock are made sufficiently strong to resist any pressure that can be brought to bear upon it. These two double sides of this dock answer the double good purpose of strength and buoyancy, as the vacancy between them must never be allowed to fill with water when a ship is to be docked; for if they were there would be no certainty of the dock rising as desired; but if a sufficient portion of them is clear of the water, then the dock must and will rise as calculated to do; for the capacity of those spaces is of such dimensions, as to allow them to lift any weight that can be required, and of course preserve the stability of the dock when the main chamber is full of water.

The fore end of this dock is formed somewhat differently from its two sides, the inner tier of logs not being quite so far from the outer tier at the bottom of the dock, as they are at the sides; but sufficiently so, to form an angle of security and leave a space large enough for all the purposes requiring buoyancy in that part of the dock.

The after part of this dock or gate end, is formed as here described, the sides of the dock are to project beyond the gates when opened far enough to allow the center post of the gate to rest a few feet within those projected ends; and at those points of the sides of the dock there will be strong upright posts well supported from the sides of the dock, to receive the shocks of the ship when entering the dock, and protect the gates from injury, and also to give the necessary buoyancy to that part of it. From this formation of the dock, it will readily be seen, that it can be caulked and repaired for many years, in the water, without taking it on shore at all, as the caulking on the inside will be as effectual as that done on its outer side.

When the ship is in her place, and the water sufficiently pumped out to allow her keel to rest on the blocks, she will be supported by shores, from the bottom of the dock, to which they are secured by hinge bolts, and to the sides of the ship by cleats nailed over their upper ends; and also by shores from the upper sides of the dock against the side of the ship, and from any other part of the dock that the condition of the ship may require.

The gates are to be formed in the common way, presenting an arch outward by their junction in the center of the dock, to resist the pressure of the water, and to be supported at their centers, and also from other points by similar shores to those that are intended to support the ship in her place; they are also to be made tight by nailing leather along the lower part of the gates so as to cover the seam that they form with their sills, and up the side of the gate that is last shut. This leather is to be nailed in such a manner as to allow it to lap over the seams when the gates are shut; and to assist the sides of the dock to bear the strain that this pressure of the water will occasion to them, there is to be a beam in two parts, a little within the gates, which will come together in the center of the dock, and be secured by bolts passing through them, and their ends will be secured to the sides of the dock between two stout knees, where a strong bolt will pass through their ends; and when the ship is passing into the dock, those beams will be canted up until she passes, and then they will assume their useful stations, and receive additional bolts for their security; there will also be a similar beam outside the gates.

The next matter of importance that has engaged my attention in the invention and construction of this plan of a floating dry dock is the method of pumping it out, so as to free it from water; and to answer this end, I propose the following novel idea.

In the fore end of the dock let there be two boxes, each of them nearly equal in length to one-half of the width of the dock, and to extend ten or more feet aft, according to the size of the dock; let the outside of those boxes bevel, so as to fit the outer part of the inside of the dock, and their inner ends also incline from the center of the dock to its sides. This form of those boxes will allow them to be raised by their side or outer ends to a considerable height before their inner ends will come in contact with each other; for as those boxes are to rest on an axle constructed within their inner lower corner, they are only to be lifted by their side or outer ends, and consequently only one-half of their weight is to be raised. This axle is so formed as to answer the purpose of discharging the boxes of the water which they contain when elevated, and as follows: The forward part of the axle is to pass out through the forepart of the dock, and to be made perfectly tight by having on it, in composition metal, the male thread of a screw five or six inches wide; and the dock to have in its side a corresponding female screw to receive it; or a leather hose, well secured to the axle and to the outside part of the dock, may answer the same purpose, and be more economical. This axle is then, say twelve or more inches in diameter, and bored from its outer end with an auger, eight inches diameter, to nearly the center of the box, and a sufficient number of holes of two or three inches bored through the axle into this large canal, to allow it to be filled with the water from the box as fast as it can run out; when the box is elevated, and thus discharges the water from the dock; and to prevent the water from returning into the box, a valve is to be fitted on the outer end of the axle, and then the water can and will be drawn off from the dock by a much smaller force than was ever done before by any other means. The box is filled with water through a valve in its bottom as it descends, which closes as it ascends. I would also propose, and advise, one of those boxes to be fitted with a siphon, which will in the commencement of freeing the dock from the water be rather more expeditious in its operation than the canting box; but as the water falls low in the dock, the canting box will be found very convenient; this siphon may be square at its lower ends, and have sliding valves to close or shut it as occasion may require; they are to be moved by a square rod cog-toothed, and a pinion and crank at its upper end. There must also be a good valve board pump in each of the side trunks, to free them from water when required; but they need not be larger than to require the labor of one man each; and by having a scupper leading from the main chamber of the dock to those trunks, they can be drained of all the water. The stretchers may be cut off at the fore end of the dock, so as to allow those boxes to be lowered close down to the bottom of the dock.

The purchase for raising those boxes should be two three-fold blocks, the fall of which is to lead to a capstan or common crab, about two feet in diameter, the bars of which may be from ten to twelve feet long. By this means one man is made equal to from 60 to 72, and can heave a weight of from 3,000 to 3,600 pounds six feet high in one minute; and two men will double that amount, say 7,200; for it is well known that a man can exert himself during that short space of time so as to produce that degree of labor, and also to continue it alternatively at short intervals for one or two hours. This admitted, it is clear that a dock for all merchant purposes can by two men be pumped out in one hour. Those boxes, if made of oak plank an inch and a half thick, will, when entirely out of the water weigh about 2,500 lbs., consequently one man can raise the box and from 500 to 1,000 pounds of water besides; but as the water will escape as fast as the box can be raised the labor will be principally confined to the lifting of the box. But it must be remembered, that this weight of 2,500 pounds is confined to the siphon box alone, as half the weight of the canting box will rest on its axle. The result therefore of lifting the latter box is two to one in weight, both of box and water; and on that account may be preferred; but where there is a sufficiency of power, the siphon box will be the most expeditious.

What I claim as my invention, is—

1. The construction and arrangement of the different parts of this dock, in the building it of logs, and the method of pumping it out, as above described; and also the economical means of connecting the whole mass together, by wood bolts double the size of those which can be used in vessels of the ordinary construction. When the siphon box is used, there must be a frame work around it, but particularly at its corners, to keep it in its place as it rises and falls.

2. I also claim the invention of building those two boxes in one, leaving a partition in the center of it fore and aft, and by dividing the channel in the axle through its center, and placing two valves on its outer end, pump out this dock without any other description of labor than the men moving on the top of it from one side to the other, the box when thus constructed will form an obtuse angle on its bottom, allowing one side to ascend as the other descends. And it may also be made to perform the same operation, by placing two rails on the upper part of the box and constructing a loaded car thereon to be moved from side to side by tackles or other machinery.

*References.*—A, the double walls of the dock; B, cross bottom logs; C, fore and aft tier of bottom logs; D, stretchers fore and aft, within the dock, to lay the blocks on, to receive the keel of the vessel; E, canting box, to pump out the dock; F, spirt-holes, to show the height of the water in the boxes when lifting them; G, valves to let the water into the boxes as they descend; H, stay on the valves, to prevent it from canting over the backway; I, hollow valve axle, out of which the water will pass when the box is lifted, (as it is to be by capstan and tackle;) J, box to be discharged by a siphon, when lifted perpendicularly by a tackle and capstan; K, siphon of copper in the box J—these boxes are to be either 10, 12 or 15 feet square, or oblong; L, platform to walk around the dock on; M, second position of the box E when canted to discharge the water; N, arch rafter, to attach the tackle to, which is to raise the water boxes; O, one of the gates shut, the other being opened within the dock, and they are hung a little more than half their width within it, which secures them from any injury by the entrance of the ship, and the extension of the sides of the dock supplies the necessary buoyancy at its after end; P, canting beam, used to secure the gates. It is to be kept secure by means of the bolt, Q, which (when it is to be raised for the admission of the vessel) are to be removed, and it is then canted up between the knees R. It is to be remarked, that there are to be two of these beams, one to be within and the other without gates. $E_2$, section of the canting box and axis—showing the valve and outlet for the discharged water; S, an opening bored into the axis, intended to receive the contents by the holes, T, and to flow out by the valve, W.

*Reference to the double box.*—E, E, the double canting box to pump out the dock as directed in the description of it; F, F, spirt-holes to show the height of the water in each side of the double box; G, G, valves to let the water into either side of the box as it descends; H, H, stays on the valves to prevent them from canting over the back way. I, I, hollow valve axle out of which the water will pass when the box is lifted, as stated in the description of it.

A A, the double walls of the docks.

JAMES BARRON.

Witnesses:

J. N. PALMER,

LOTTIE D. ANDERSON.